US007483439B2

(12) United States Patent
Shepherd et al.

(10) Patent No.: US 7,483,439 B2
(45) Date of Patent: Jan. 27, 2009

(54) VPN SERVICES USING ADDRESS TRANSLATION OVER AN IPV6 NETWORK

(75) Inventors: Gregory Shepherd, Eugene, OR (US); Dino Farinacci, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 397 days.

(21) Appl. No.: 11/220,938

(22) Filed: Sep. 7, 2005

(65) Prior Publication Data

US 2006/0209831 A1  Sep. 21, 2006

Related U.S. Application Data

(60) Provisional application No. 60/664,013, filed on Mar. 21, 2005.

(51) Int. Cl.
*H04L 12/28* (2006.01)
*H04L 12/56* (2006.01)
(52) U.S. Cl. .................. 370/401; 370/389; 370/390; 370/392
(58) Field of Classification Search .......... 370/389, 370/390, 392, 401, 404
See application file for complete search history.

(56) References Cited

U.S. PATENT DOCUMENTS

| 6,853,639 | B1* | 2/2005 | Watanuki et al. ............ 370/390 |
| 2003/0076854 | A1* | 4/2003 | Mudhar et al. .............. 370/432 |
| 2003/0108041 | A1* | 6/2003 | Aysan et al. ................ 370/389 |
| 2006/0045036 | A1* | 3/2006 | Isobe et al. ................. 370/312 |
| 2006/0168047 | A1* | 7/2006 | Li ............................... 709/206 |

OTHER PUBLICATIONS

E. Rosen et al., "BGP/MPLS VPNs", Network Working Group RFC 2547, Mar. 1999.
E. Rosen et al., "Multicast in MPLS/BGP IP VPNs", Network Working Group, Internet Draft, Dec. 2004.

* cited by examiner

*Primary Examiner*—Ronald Abelson
(74) *Attorney, Agent, or Firm*—Cindy Kaplan

(57) ABSTRACT

A method and system for translation of virtual private network (VPN) addresses over a provider network are disclosed. The method includes creating a multipoint tunnel extending between customer edge routers in a VPN network and over the provider network. The multipoint tunnel is identified with a multicast address and multicast packets are sent over the tunnel to identify tunnel endpoints at customer edge routers within the VPN. The method further includes converting, at one of the customer edge routers, a VPN join message to a provider join message and sending it over the provider network.

29 Claims, 6 Drawing Sheets

VPN SERVICES USING ADDRESS TRANSLATION OVER AN IPV6 NETWORK

STATEMENT OF RELATED APPLICATION

The present application claims priority from U.S. Provisional Application No. 60/664,013, entitled METHOD AND SYSTEM FOR INTERCONNECTING IPv4 NETWORKS ACROSS IPv6 NETWORK and filed on Mar. 21, 2005, The contents of this provisional application are incorporated herein by reference in its entirety.

BACKGROUND OF THE INVENTION

The present invention relates generally to data networking and, more specifically, to providing MVPN (Multicast Virtual Private Network) services using IPv4-in-IPv6 address translation over an IPv6 network.

To accommodate the explosive growth of the Internet, a very large number of network nodes have been configured to employ IP (Internet Protocol). Internet Protocol version 4 (IPv4) is the most widely deployed version of IP. However, the broad acceptance of IP has placed considerable strain on the 32-bit addressing scheme available in IPv4. Consequently, the Internet Engineering Task Force (IETF) developed a new Internet Protocol Standard, Internet Protocol version 6 (IPv6). Advantages of IPv6 include an enormous expansion in the available address space to accommodate both greater ubiquity of Internet-enabled devices as well as less reliance on cumbersome network address translation schemes which have been utilized to conserve addresses. IPv6 also provides highly useful auto-configuration capabilities.

IP networks include service provider networks which often use their IP backbone to provide IP VPNs for its customers. Virtual Private Networks serve as network overlays on IP network infrastructures. Many companies have created their own VPN to accommodate the needs of remote employees and distant offices. In order for traffic within a VPN to travel from one VPN site to another, special protocols and procedures must be implemented by the VPN service provider. One method is described in IETF draft "Multicast in MPLS/BGP IP VPNs" Rosen et al., (draft-rosen-vpn-mcast-08.txt), December 2004. See also, "BGP/MPLS VPNs", RFC 2547, Category: Informational, E. Rosen, Y. Rekhter, March 1999. Traffic sent between VPNs is received at a provider edge (PE) router. A PE which attaches to a particular multicast-enabled VPN belongs to a corresponding Multicast Domain. For each Multicast Domain, there is a default Multicast Distribution Tree (MDT), through the backbone, connecting all of the PEs that belong to that Multicast Domain. The MDTs are created by running Protocol Independent Multicast (PIM) in the backbone, and in general an MDT also includes P (provider) routers on the paths between the PE routers. In this method, all PEs in a MDT group receive VPN traffic and configuration changes are required at the service provider PEs.

It is desired to provide scalable IPv4 and IPv6 unicast and multicast VPNs over one or more service provider networks so that IPv4 VPNs run better when IPv6 is deployed in the service provider network. It is further desired that the system and method which provides the scalable VPNs over the service provider networks run in CE (customer edge) routers rather than PE routers such that the termination endpoints for the VPN are in the CE routers.

SUMMARY OF THE INVENTION

A method and system for translation of virtual private network (VPN) addresses over a provider network are disclosed. The method includes creating a multipoint tunnel extending between customer edge routers in a VPN network and over the provider network. The multipoint tunnel is identified with a multicast address and multicast packets are sent over the tunnel to identify tunnel endpoints at customer edge routers within the VPN. The method further includes converting, at one of the customer edge routers, VPN join and prune messages to a provider join and prune message and sending it over the provider network.

In another aspect of the invention, a method for providing virtual private network communication over an IPv6 network generally comprises associating a group address with a VPN, creating a multipoint tunnel extending between the VPN and the IPv6 network, and translating VPN source and group addresses into a provider source and group state. IPv4 packets received at a customer edge router of the VPN are encapsulated in an IPv6 packet and sent to the multipoint tunnel for transmittal over the IPv6 network.

A computer program product for translation of virtual private network addresses over a provider network generally comprises: code that creates a multipoint tunnel extending between customer edge routers in a VPN network and over the provider network; code that sends multicast packets over the tunnel to identify tunnel endpoints at customer edge routers within the VPN; code that converts, at one of the customer edge routers, a VPN join message to a provider join message and sends it over the provider network; and a computer-readable medium that stores the codes.

Further understanding of the nature and advantages of the inventions herein may be realized by reference to the remaining portions of the specification and the attached drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system of the present invention provide unique customer-to-core source and group mapping and state-tree construction while generally eliminating customer address collisions. Source and destination mapping is performed for unicast and multicast packets. In one embodiment, VPN customer source and group IPv4 addresses are translated into a service provider's IPv6 source and group state and a multipoint tunnel is used among the VPN sites. As described in detail below, the encapsulation uses the source address of the CE router and the destination address as dynamically determined by sending ARP over the multipoint tunnel.

It is to be understood that the present invention is not limited to address translation for IPv4 VPNs over an IPv6 provider network. The VPN network may also be operating IPv6, for example. The system and method described herein may also be used when running MPLS in the VPN network over the IPv6 provider network.

The present invention operates in the context of a data communication network including multiple network elements. Some of the elements in a network that employs the present invention may be network devices such as routers. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes memory and a processor. When acting under the control of appropriate software or firmware, the CPU is responsible for such router tasks as routing table computations, network management, and general processing of packets. It preferably accomplishes all of these functions under the control of software including an operating system and any appropriate applications software. Memory can be non-volatile RAM or ROM. However, there are many different ways in which memory could be coupled to the system. A router may be implemented on a general purpose network host machine such as a computer system or network device described below with respect to FIG. 6.

Figure 1:
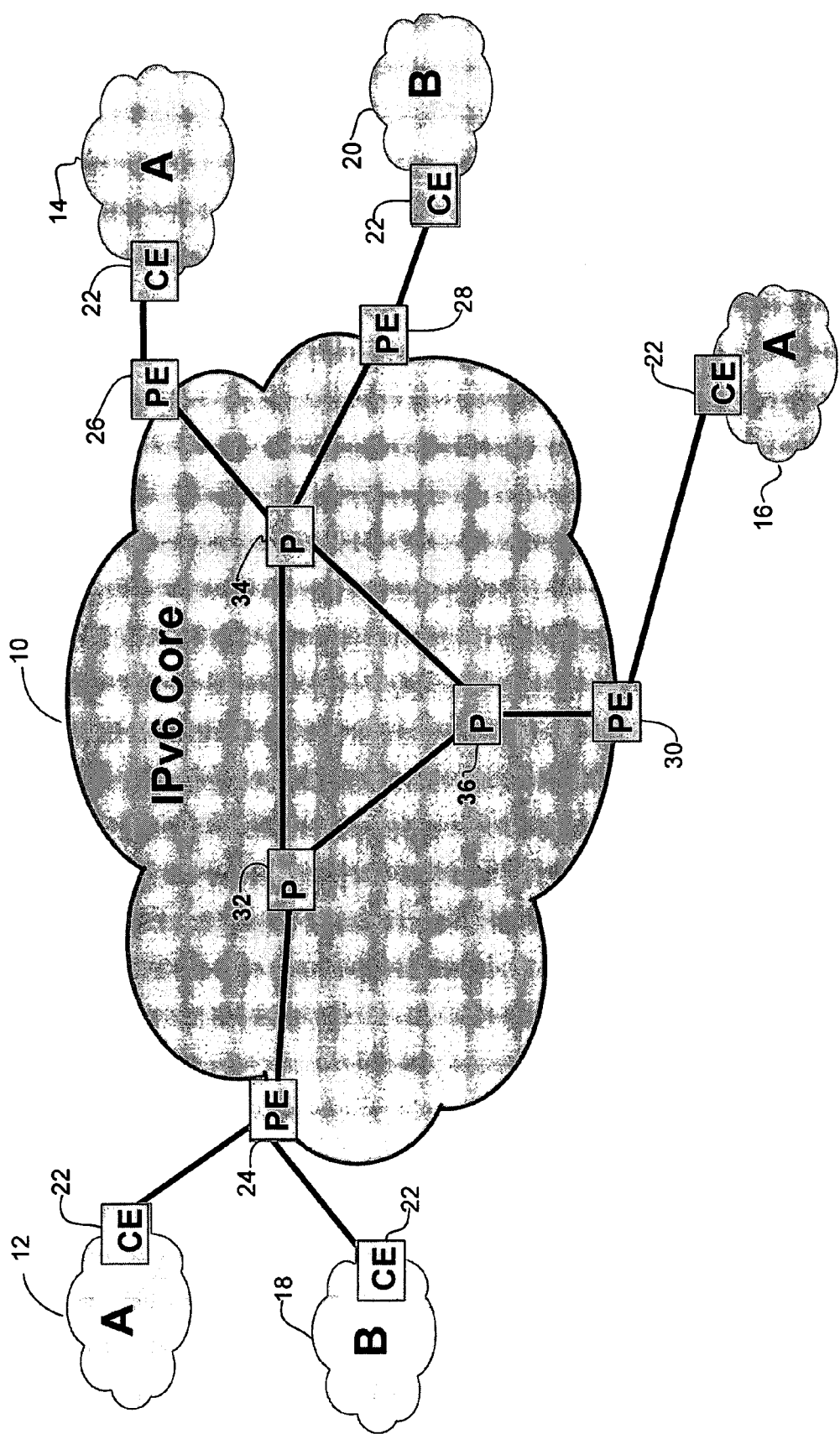
FIG. 1 depicts an example of two customer virtual private networks with a service provider backbone.

FIG. 1 depicts a networking environment suitable for implementing an embodiment of the present invention. A service provider (e.g., Internet Service Provider (ISP)) network is in communication with two customer networks, customer A and customer B. The customer networks include five IPv4 VPN sites (customer A sites 12, 14, 16 and customer B sites 18, 20) which are in communication with an IPv6 core network 10. Each customer network includes customer edge routers CE 22. For clarity of depiction, only customer edge routers 22 are shown in FIG. 1 and interior customer nodes are omitted. The IPv6 network 10 includes PE routers 24, 26, 28, 30 and P routers 32, 34, 36, which implement IPv6 layer functionality. The network 10 may also use IPv4 for traditional public packet services. The edge nodes 24, 26, 28, 30 at the ingress and egress of the IPv6 network 10 are in communication with the VPN sites 12 and 18, 14, 20, and 16, respectively.

It is to be understood that the network shown in FIG. 1 is only one example of a network in which the method and system of the present invention may be used, and that the network may have different configurations including any number of networks or network sites, without departing from the scope of the invention. Also, as noted above the VPN network may be operating using an IPv6 addressing scheme rather than IPv4.

The method and system of the present invention provide a CE managed service, which requires no changes to the configuration or functionality of the PE routers 24, 26, 28, 30 or P routers 32, 34, 36. The method and system described herein may simplify the operation of P and PE routers that might run other mechanisms for providing VPN services (e.g., RFC 2547, "BGP/MPLS VPNs", by E. Rosen, March 1999). The ISP based PE routers 24, 26, 28, 30 and P routers 32, 34, 36 run IPv6 and PIM (Protocol Independent Multicast). PIM is used to dynamically create a multicast distribution tree to ensure distribution to intended receivers while limiting distribution so that network segments that are not in the path between the source and receivers are not burdened with unnecessary traffic. The present invention is described herein with reference to the implementation of PIM, however, it is to be understood that it is not limited to this particular protocol suite.

PIM runs along with IGP at each site as well as over the multipoint tunnel (described below). Since the ISP infrastructure uses IPv6 PIM, precise multicast replication can be performed among the VPN sites 12, 14, 16, 18, 20. As described in detail below, separate per-VPN customer per (S,G) forwarding tress are maintained for IPv4 customers over the IPv6 service provider core without any modifications to existing IPv6 multicast core requirements. The translation feature described herein is therefore only needed at the CE routers 22. The CE routers 22 are configured with an underlying IPv6 multicast address (and possibly a key so the tunnel can be IPsec) to identify the multipoint tunnel for the VPN.

Figure 2:
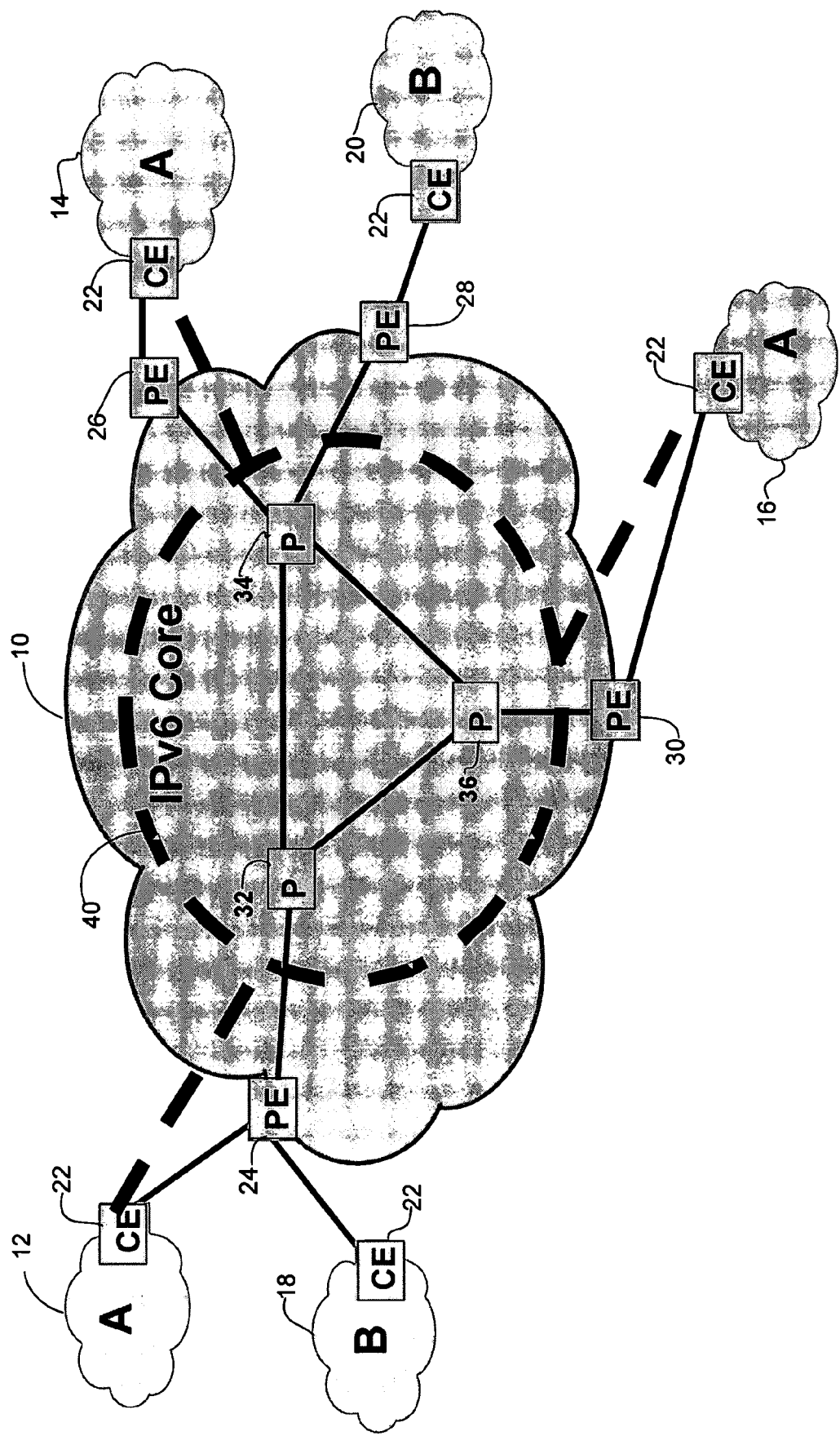
FIG. 2 depicts the network of FIG. 1 with a multipoint tunnel having endpoints at CE devices in one of the VPN networks and extending through the service provider network.

Each VPN customer is assigned an IPv6 multicast scoped prefix. In one example, the IPv6 multicast address is assigned per VPN customer with the embedded VPN ID vvvv:

ff18:vvvv::

The high-order bits are used to create a multipoint tunnel 40 (FIG. 2). The multipoint tunnel 40 (which uses the VPN ID IPv6 multicast address) is used between the VPN A customer sites 12, 14, 16 for dynamic discovery of CE devices 22.

Sending IGP and PIM Hellos are broadcasted over the tunnel. Broadcasting over the tunnel is realized by using IPv6 multicast in the underlying network. ARP (Address Resolution Protocol) is used to identify the underlying tunnel endpoints. CE router 22 sends an ARP request message over the tunnel 40 for a VPN based next-hop (on the tunnel's subnet) and the hardware address returned is an IPv6 address internal to the core.

Forwarding to receiver sites may be a subset of all VPN sites, therefore, there should be precise replication/forwarding and no IPv4 multicast packets going over the multipoint tunnel. To address this issue, the CE routers 22 in the receiver sites take an IPv4 PIM (S,G) join (after sending it over the multipoint tunnel) and build an IPv6 PIM (S,G) join. The join message received from over the tunnel is not put in the oif-list (outgoing interfaces list). It is the underlying multicast tunnel which is built that is put in the oif-list for the VPNs multicast route entry.

Figure 3:
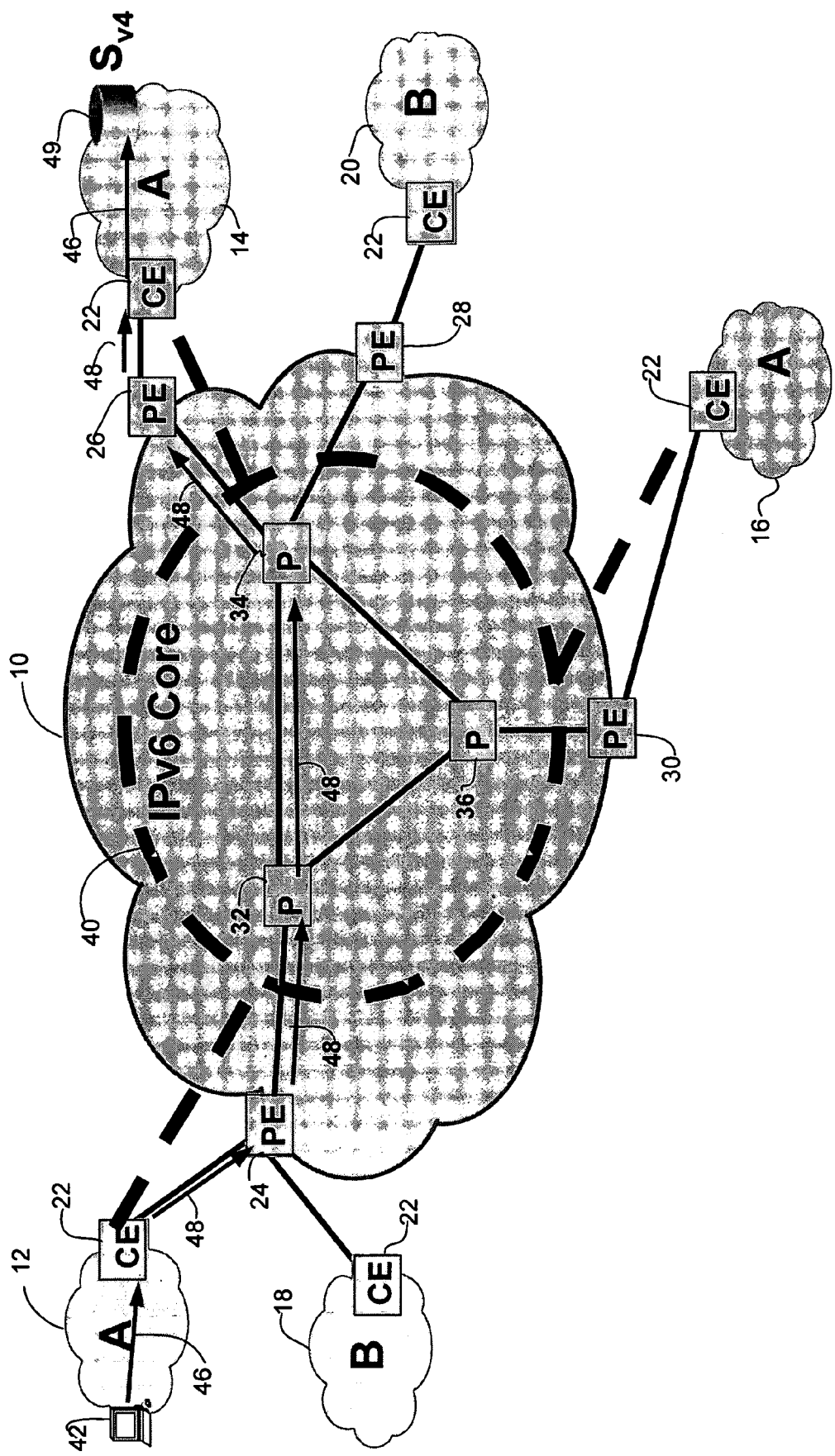
FIG. 3 depicts the network of FIG. 2 and illustrates the sending of join messages in the VPN and service provider networks.

FIG. 3 illustrates sending of the IPv4 (S,G) and IPv6 (S,G) join messages. CE 22 in customer A site 12 receives a message 46 from node 42. The CE 22 converts an IPv4 (S,G) join message to a core IPv6 (S,G) join message and sends the join message. The join message is received at the sites where the sources or RP is located. In the above notation, S is the underlying IPv6 address of CE router at source site and G is a group address derived from the IPv4 (S,G) address. In one example:

$$G=\text{ff18::vvvv::}S_{v4}:G_{v4}:xxxx; \text{ or}$$

$$G=\text{ff18:vvvv:ssss:ssss:gggg:gggg:xxxx.}$$

In this example, s and g are the nibbles of the IPv4 (S,G) address and vvvv is a 16-bit VPN ID value. The 16-bit value is the same 16-bit VPN ID value used for the multipoint ARP tunnel. The lower bits, x, may be reserved for future differentiation of service (e.g., port demuxing) or the VPN ID may be expanded to accommodate more VPN customers. The 16 bit prefix may be, for example, ff05, ff08, or have a new scope ID assignment. The T flag may also be 1. It is to be understood that the VPN ID value may be less than or greater than 16 bits, without departing from the scope of the invention.

Referring again to FIG. 3, the IPv6 join message 48 is transmitted from CE 22 at site 12 to PE 24 in the IPv6 core network 10. The IPv6 join message 48 is forwarded over the IPv6 network to PE router 26. CE router 26 converts the IPv6 (S,G) join back into IPv4 (S,G) join using the $S_{v4}$ and $G_{v4}$ learned from the embedded addresses of the IPv6 join and sends IPv4 (S,G) join message 46 to node 49.

PIM may run in any mode, including ASM (Any-Source Multicast), SSM (Source-Specific Multicast), and Bi-Directional mode in the VPN sites. For ASM and Bi-Directional modes, the RP (Rendezvous Point) can be located at any of the VPN sites. For joining SSM channels, the member in the receiver site will join a (S,G) which are IPv4 addresses. The IGP routing within the VPN allows the PIM join to travel to the edge and over the multipoint tunnel. VPN internal multicast state is setup via normal IPv4 PIM.

The IPv6 core PIM may also run in any mode, including ASM, SSM, and Bi-Directional mode. Thus, no coordination is required between the VPN sites and the service providers that realize the VPN.

The IPv6 (S,G) route in the core allows precise replication for the multicast flow. The IPv6 group address is globally unique because the VPN ID is included in the address. For debugging purposes in the core, the IPv4 (S,G) address is known since it is embedded in the IPv6 group address. Since the VPN customer IGP runs over the same VPN ID multicast core group, and the CE endpoints are all known (automatically) the same infrastructure can support both multicast and unicast VPN services.

Figure 4:
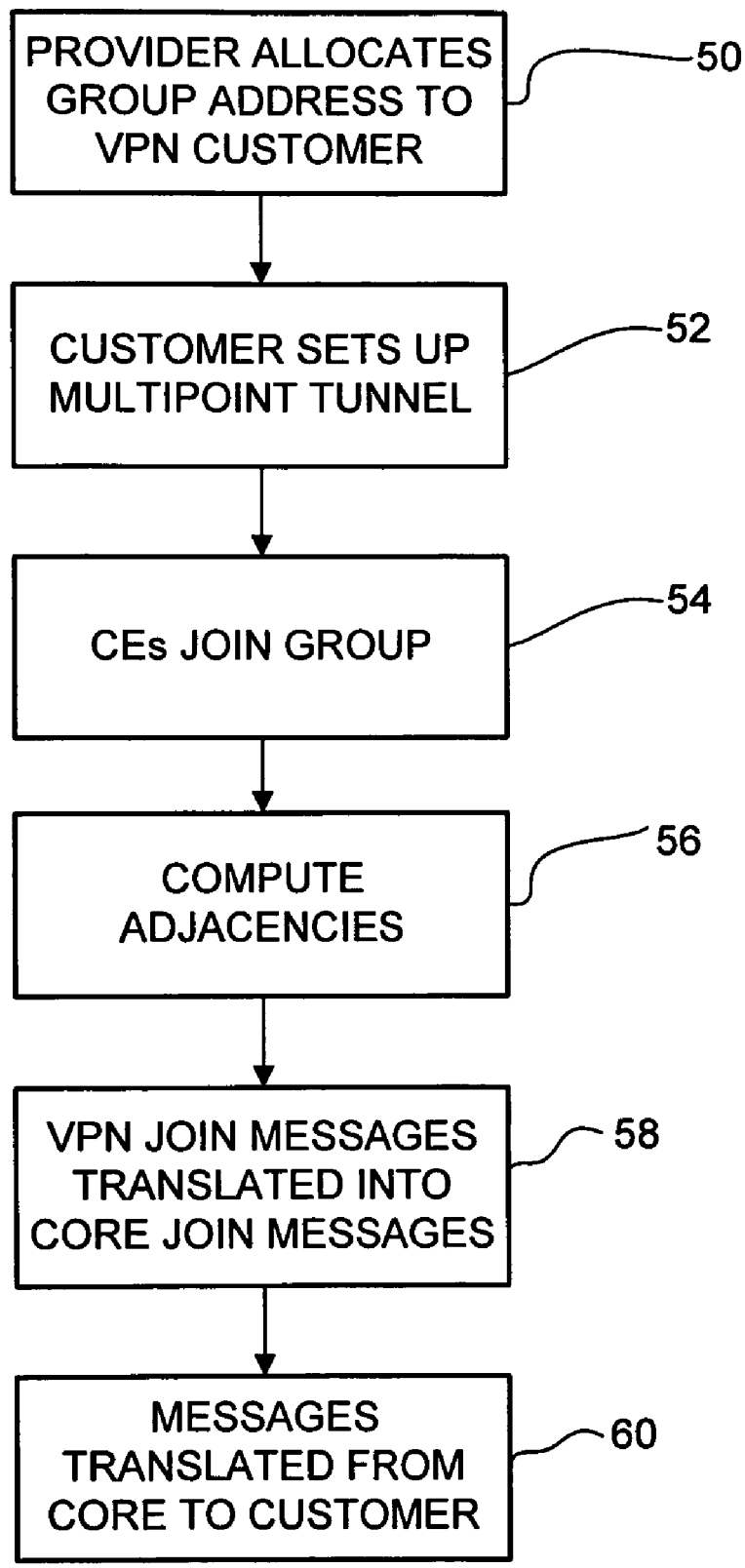
FIG. 4 is a flowchart illustrating a process for providing IPv4-in-IPv6 address translation over the service provider network according to one embodiment of the present invention.

FIG. 4 is a flowchart illustrating the process described above for IPv4-in-IPv6 address translation over the IPv6 network 10. At step 50, the service provider allocates group addresses to VPN customers A and B. At step 52 each customer sets up a multipoint tunnel, as previously described. The CEs 22 from the customer network which set up the tunnel join the group identified by the group address (step 54). A unicast routing protocol is used to compute adjacencies (step 56). The VPN based join messages are translated into core based join messages from adjoining sites (step 58) and then translated from core to the customer (step 60).

Figure 5:
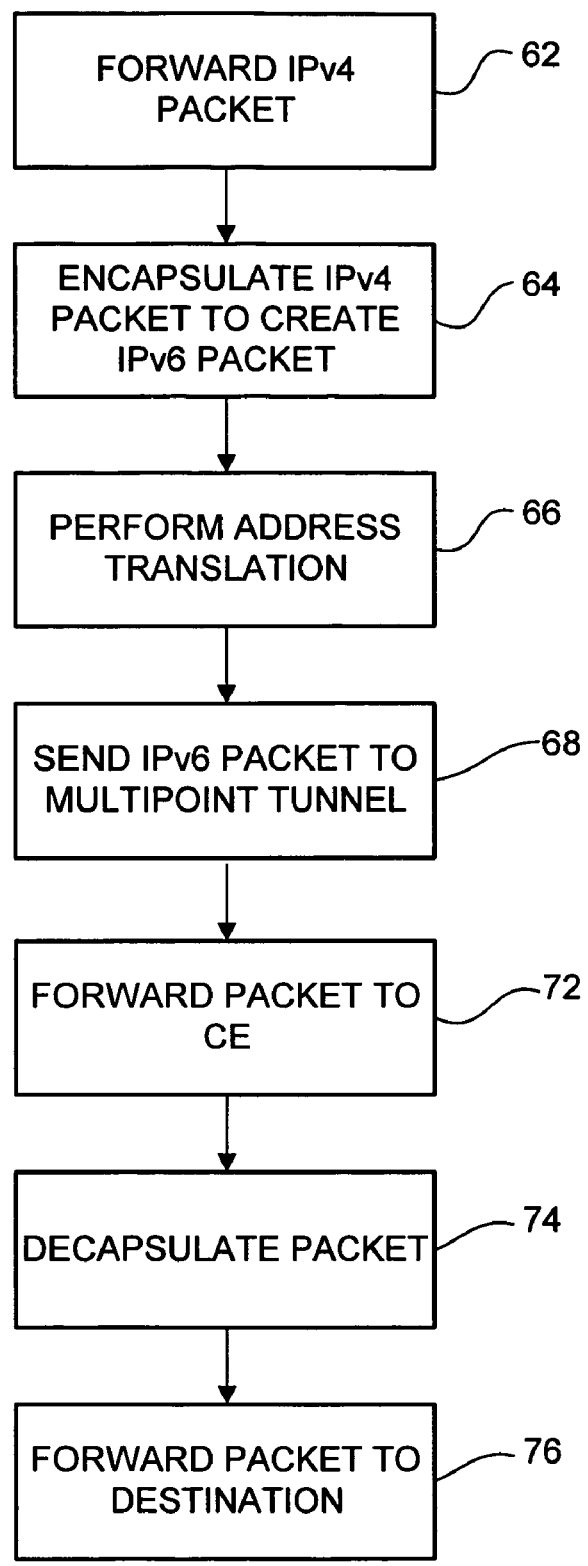
FIG. 5 is a flowchart illustrating a process for transferring data between virtual private network sites over the service provider network.

FIG. 5 illustrates a process for forwarding packets from one customer network site to another after the multipoint tunnel 40 has been set up and the CE routers 22 have joined their respective groups. At step 62 a packet is forwarded at one of the customer sites as an IPv4 packet to the edge of the network following the IPv4 default route. The CE router 22 encapsulates the IPv4 packet in an IPv6 packet (step 64). Address translation is performed based on the join information (step 66). The CE router 22 then sends the packet to the hardware address learned for the multipoint tunnel 40 (step 68). The packet is then transmitted to the destination CE router 22 (step 72). The destination CE router decapsulates the packet (step 74) and forwards the packet to its destination node (step 76).

Figure 6:
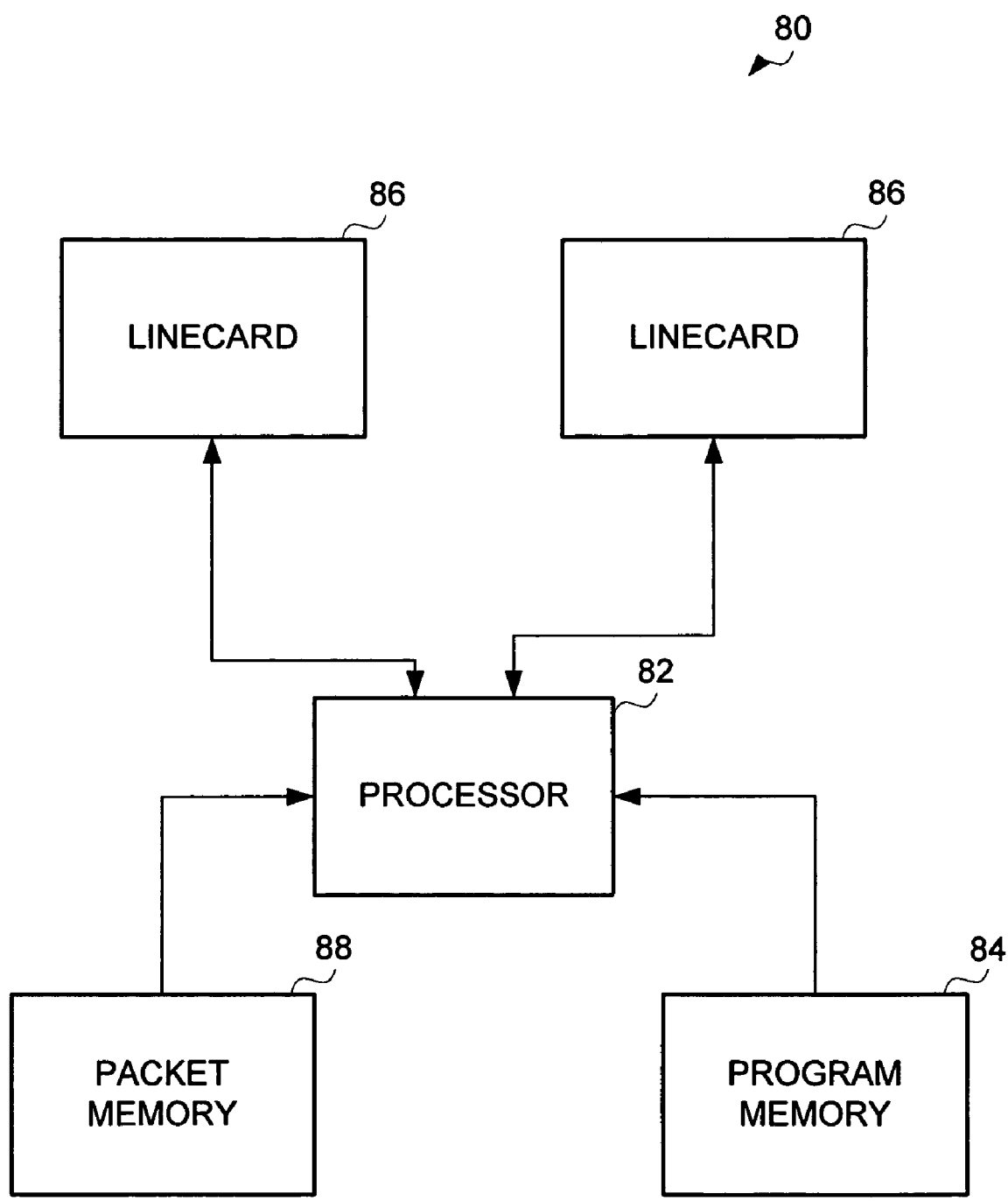
FIG. 6 depicts a network device useful in implementing embodiments of the present invention.

FIG. 6 depicts a network device 80 that may be used to implement the method and system described above. In one embodiment, network device 80 is a programmable machine that may be implemented in hardware, software, or any combination thereof. A processor 82 executes code stored in a program memory 84. Program memory 84 is one example of a computer-readable medium. Program memory 84 can be a volatile memory. Another form of computer-readable medium storing the same codes may be some type of non-volatile storage such as floppy disks, CD-ROMs, DVD-ROMs, hard disks, flash memory, etc. A carrier wave that carries the code across a network is another example of a computer-readable medium.

Network device 80 interfaces with physical media via a plurality of linecards 86. As packets are received, processed, and forwarded by network device 80, they may be stored in a packet memory 88. Packet transmission operations may occur partially or completely within one of the linecards 86. To implement functionality according to the present invention, linecards 86 may incorporate processing and memory resources similar to those discussed above in connection with the network device as a whole. Network device 80 implements all of the features provided by the present invention.

Network device 80 shown in FIG. 6 is only one example of a computer system suitable for use with the invention. Other devices and systems having different configurations of subsystems may also be utilized. Communication between computers within the network is made possible with the use of communication protocols, which govern how computers exchange information over a network.

As can be observed from the foregoing, the present invention provides many advantages. For example, the method and system provide for unique core (S,G) trees without customer or core address conflicts and without any dynamic data-driven signaling mechanisms. Precise multicast state is maintained inside the IPv6 core network and address collisions between VPN customers are generally eliminated. Furthermore, the same infrastructure can support both multicast and unicast VPN services without additional protocols.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for translation of virtual private network (VPN) addresses over a provider network, the method comprising:
   creating a multipoint tunnel extending between customer edge routers in a VPN network and over the provider network, the multipoint tunnel identified with a multicast address;
   sending multicast packets over the multipoint tunnel to identify multipoint tunnel endpoints at customer edge routers within the VPN; and
   converting, at one of the customer edge routers, a VPN join message to a provider join message and sending it over the provider network;
   wherein the VPN is an IPv4 network, the provider network is an IPv6 network, and the customer edge router is configured with an IPv6 multicast address to identify the multipoint tunnel associated with the VPN.

2. The method of claim 1 wherein the multicast address comprises an (S,G) address.

3. The method of claim 2 wherein the multicast address comprises a 16-bit VPN ID value.

4. The method of claim 1 wherein sending multicast packets over the multipoint tunnel to identify tunnel endpoints comprises utilizing address resolution protocol.

5. The method of claim 1 wherein sending said VPN join message over the provider network comprises not sending said VPN join message over the multipoint tunnel.

6. The method of claim 1 wherein the VPN is associated with a multicast prefix.

7. A method for translation of virtual private network (VPN) addresses over a provider network, the method comprising:
   creating a multipoint tunnel extending between customer edge routers in a VPN network and over the provider network, the multipoint tunnel identified with a multicast address;
   sending multicast packets over the multipoint tunnel to identify multipoint tunnel endpoints at customer edge routers within the VPN; and
   converting, at one of the customer edge routers, a VPN join message to a provider join message and sending it over the provider network;
   wherein S is an IPv6 address assigned to a customer edge router at a source site and G is a group address derived from an IPv4 (S,G) address.

8. The method of claim 7 wherein the multicast address comprises a 16-bit VPN ID value.

9. A method for providing virtual private network (VPN) communication over an IPv6 network, the method comprising:
   associating a group address with a VPN;
   creating a multipoint tunnel extending between the VPN and the IPv6 network;
   translating a VPN source into a provider source, and group addresses into a group state;
   encapsulating an IPv4 packet received at a customer edge router of the VPN in an IPv6 packet; and
   sending the encapsulated packet to the multipoint tunnel for transmittal over the IPv6 network.

10. The method of claim 9 wherein the customer edge router is configured with an IPv6 multicast address to identify the multipoint tunnel associated with the VPN.

11. The method of claim 10 wherein the multicast address comprises an (S,G) address.

12. The method of claim 11 wherein S is an IPv6 address assigned to a customer edge router at a source site and G is a group address derived from an IPv4 (S,G) address.

13. The method of claim 11 wherein the multicast address comprises a 16-bit VPN ID value.

14. A computer-readable storage medium encoded with a computer program for translation of virtual private network (VPN) addresses over a provider network, the program comprising:
   code that creates a multipoint tunnel extending between customer edge routers in a VPN network and over the provider network, the multipoint tunnel identified with a multicast address;
   code that sends multicast packets over the multipoint tunnel to identify tunnel endpoints at customer edge routers within the VPN;
   code that converts, at one of the customer edge routers, a VPN join message to a provider join message and sends it over the provider network; and
   a computer-readable medium that stores the codes;
   wherein the VPN is an IPv4 network, the provider network is an IPv6 network, and the customer edge router is configured with an IPv6 multicast address to identify the multipoint tunnel associated with the VPN.

15. The computer-readable storage medium of claim 14 wherein sending multicast packets over the multipoint tunnel to identify tunnel endpoints comprises utilizing address resolution protocol.

16. The computer-readable storage medium of claim 14 wherein routers in the provider network are configured to operate protocol independent multicast.

17. The computer-readable storage medium of claim 14 wherein the multicast address comprises an (S, G) address.

18. The computer-readable storage medium of claim 17 wherein S is an IPv6 address assigned to a customer edge router at a source site and G is a group address derived from an IPv4 (S,G) address.

19. An apparatus for providing virtual private network (VPN) communication over an IPv6 network, the method comprising:
   means for associating a group address with a VPN;
   means for creating a multipoint tunnel extending between the VPN and the IPv6 network;
   means for translating VPN source and group addresses into a provider source and group state;
   means for encapsulating an IPv4 packet received at a customer edge router of the VPN in an IPv6 packet; and
   means for sending the encapsulated packet to the multipoint tunnel for transmittal over the IPv6 network.

20. The apparatus of claim 19 wherein means for associating a group address with a VPN comprises assigning an IPv6 multicast prefix to the VPN.

21. The apparatus of claim 19 wherein means for translating VPN source and group addresses comprises means for translating customer source and group IPv4 addresses into IPv6 source and groups state.

22. The apparatus of claim 19 wherein means for sending the encapsulated packet for the multipoint tunnel comprises means for sending the packet to a hardware address for the multipoint tunnel.

23. The apparatus of claim 19 wherein the VPN and the IPv6 network are each configured to run protocol independent multicast in any mode.

24. An apparatus configured for translation of virtual private network (VPN) addresses, the apparatus located in a network operating a first addressing scheme and comprising:
   a processor operable to send multicast packets over a multipoint tunnel having one endpoint at an edge router comprising the processor, the multicast packets identifying endpoints of the multipoint tunnel, convert a VPN join message to a provider join message, and send said join message to a network operating a second addressing scheme, wherein the processor is configured to convert VPN join and prune messages to a provider join and prune message; and
   a computer-readable medium.

25. The apparatus of claim 24 wherein said first addressing scheme is IPv4 and said second addressing scheme is IPv6.

26. The apparatus of claim 24 wherein said first and second addressing schemes are both IPv6.

27. The apparatus of claim 24 wherein the VPN network is configured to run MPLS and the second addressing scheme is IPv6.

28. The apparatus of claim 24 wherein the VPN is an IPv4 network and the provider network is an IPv6 network.

29. The apparatus of claim 28 wherein the customer edge router is configured with an IPv6 multicast address to identify the multipoint tunnel associated with the VPN.

* * * * *